«United States Patent» [15] 3,668,255
Meuly et al. [45] June 6, 1972

[54] PROCESS FOR ALKYLATION OF ALIPHATIC KETONES AND PRODUCT

[72] Inventors: Walter C. Meuly, New Brunswick; Peter S. Gradeff, Somerset, both of N.J.

[73] Assignee: Rhodia Inc., New York, N.Y.

[22] Filed: Oct. 31, 1967

[21] Appl. No.: 679,543

Related U.S. Application Data

[63] Continuation-in-part of Ser. Nos. 241,036, Nov. 29, 1962, abandoned, and Ser. No. 502,585, Oct. 22, 1965, abandoned.

[52] U.S. Cl. ........................260/586 R, 252/522, 260/593 R
[51] Int. Cl. ................C07c 49/06, C07c 49/28, C07c 49/30
[58] Field of Search .........................................260/586, 593

[56] References Cited

UNITED STATES PATENTS 2,795,617  6/1957  Kimel et al............................260/593
3,114,772  12/1963  Lorette et al. .........................260/586

OTHER PUBLICATIONS

Babayan et al., " Chemical Abstracts" Vol. 49, 10879d (1954).
Bosshard et al., " Helvetica Chimica Acta," Vol. 42, Fasaculus 7, pp. 2746– 2750 (1959).

Primary Examiner—Daniel D. Horwitz
Assistant Examiner—Norman Morgenstern
Attorney—Janes & Chapman

[57] ABSTRACT

A process is provided for the alkylation of aliphatic ketones having an alpha hydrogen, substitution occurring on the carbon alpha to the carbonyl group, by use of solid alkali in the presence of an organic amine and/or ammonia as a catalyst.

Alkenyl highly branched ketones having a pleasant odor also are provided, useful in the formulation of perfumes and perfume bases.

7 Claims, No Drawings

PROCESS FOR ALKYLATION OF ALIPHATIC KETONES AND PRODUCT

This application is a continuation-in-part of Ser. No. 241,036, filed Nov. 29, 1962, and of Ser. No. 502,585, filed Oct. 22, 1965 both now abandoned.

This invention relates to a process of general application for the alkylation of aliphatic ketones on an α-carbon atom having a replaceable hydrogen, adjacent to the carbonyl group. This invention also relates to highly branched aliphatic ketones made accessible for the first time by the process described herein.

No simple satisfactory process is available for the direct alkylation of aliphatic ketones and more generally, for the synthesis of higher ketones from the lower members of the series. It is known, of course, that many aliphatic ketones may be alkylated by the use of sodamide in liquid ammonia or such reagents as metallic potassium and potassium tertiary butoxide. For instance, methyl ethyl ketone has been prepared from acetone by the use of sodamide in liquid ammonia, with the very reactive methyl iodide, Fuson, *Advanced Organic Chemistry*, New York, John Wiley & Sons (1950) p. 421. Similarly, the reaction of cyclohexanone with allyl bromide, sodamide and liquid ammonia is described in *Organic Syntheses, Collective Volume* III, p. 44, to give 2-allyl-cyclohexanone. Certain cyclic ketones in the field of steroids have been successfully reacted with potassium tertiary butoxide and methyl iodide, to introduce angular methyl groups into the steroid nucleus, Fieser and Fieser, *Advanced Organic Chemistry*, Reinhold (1961) p. 445.

The obvious disadvantage of the process described above with sodamide resides in the use of a reagent which is not convenient for large scale operation, because it forms explosive mixtures, on standing, and in the necessity of using large quantities of liquid ammonia. Potassium tertiary butoxide obviates the use of liquid ammonia but metallic potassium is a hazardous reagent, which requires many special precautions and manifestly would constitute a problem on a large-scale operation.

Simple methods for the alkylation of ketones on the carbon atom adjacent to the carbonyl group, without the use of sodamide or the condensing agents based on or derived from metallic sodium and potassium as mentioned above, are available only when the ketone contains a second activating group. Two instances have been reported with ketones containing an aromatic group. Crossley in U.S. Pat. No. 2,644,843, successfully alkylated benzyl methyl ketone with an alkyl halide and potassium hydroxide. Essentially under the same conditions, Schultz *J. Am. Chem. Soc.* 75 1072 (1953) alkylated desoxybenzoin. The success of these two experiments is obviously due to the presence of at least one aromatic group, which is known to activate the hydrogen on the adjacent methylene group.

The alkylation of acetylacetone and ethylaceto acetate with aqueous potassium hydroxide, in the presence of a quaternary ammonium compound as a catalyst, reported by Babayan et al. *Zhur Obshschei Khim* 24 1887 (1954); *C.A.* 49 10879 (1955) is another instance of alkylation of a ketone in which the hydrogen on the methylene group is activated by two adjacent carbonyl groups. In fact, the α-hydrogen is so labile that a catalyst is not needed in this reaction; Brandstrom, *Acta Chim. Scand.* 13 607 (1959) reported better yields than Babayan et al. were able to obtain with ethylacetoacetate, using alcoholic solution of sodium hydroxide, and no catalyst.

In the case of aliphatic monoketones, however, alkylation has not been successfully conducted, except with the condensing agents mentioned above, sodium and potassium metal alcoholates, and sodamide, under strictly anhydrous conditions. There are only two exceptions, to our knowledge. One instance was reported by Nef in *Annalen* 310, 318 (1900) who alkylated acetone with potassium hydroxide and methyl iodide, at 100° – 140° C., and obtained a mixture of mono-, di-, tri-, tetra-, and pentasubstituted products. The reaction, however, has no general application since it has not been successfully applied to ketones higher than acetone and when we repeated Nef's experiment by using methyl chloride instead of methyl iodide, or sodium hydroxide instead of potassium hydroxide, acetone did not undergo alkylation.

The second instance has been reported more recently in British Pat. No. 851,658 and German Pat. No. 1,112,731, for the condensation of acetone with 1-chloro-3-methyl-2-butene in the presence of potassium hydroxide, which gave 6-methyl-5-hepten-2-one. Kulesza et al. *Zeszyty Nauk Politech Lodz., Chem. Spozywcza* No. 10.21–6 (1966) *Chem.Abs.* 66 7985–6 (1967) reported that the yield of 2-methyl-2-hepten-6-one from acetone and 1-chloro-3-methyl-2-butene and sodium or potassium, using this process of these patents, at 5° to 65° C. in 0.5 to 8 hours reaction time, was ≦ 18 percent, and not 40–50 percent as reported in the patents. We found that this reaction also fails when applied to methyl ethyl ketone and cyclohexanone instead of acetone. Moreover, in the case of acetone, the product obtained as described in British Pat. No. 851,658 is not pure, as indicated by the wide range in boiling point and refractive indices of the several fractions obtained, as well as the discrepancy in refractive index with the refractive index of pure 6-methyl 5-hepten-2-one. This will be illustrated further below. Another disadvantage is that, according to the process of British Pat. No. 851,658, the more expensive potassium hydroxide must be used, because sodium hydroxide is stated to give considerably inferior results.

The foregoing summary demonstrates that, apart from the two instances of Nef and British Pat. No. 851,658, aliphatic monoketones have not been successfully alkylated with alkyl halides, in the presence of an alkali hydroxide.

In the process of the instant invention, alkylation of aliphatic monoketones is conveniently conducted with sodium or potassium hydroxide in solid form in the presence of an organic amine or ammonia, wherein the amino nitrogen or ammonia is not a part of nor attached to an aromatic system. Thus, organic amine bases, in their free state or in the form of derivatives such as their salts, organic hydroxy amines, or amino acids; and amine-forming and ammonia-forming compounds which in the presence of alkali form amines or ammonia, can be used. Aromatic amines, such as aniline, dimethylaniline, or heterocyclic nitrogen compounds having an aromatic character, such as pyridine and collidine, are not effective in this process.

The alkylation proceeds in accordance with the following reaction:

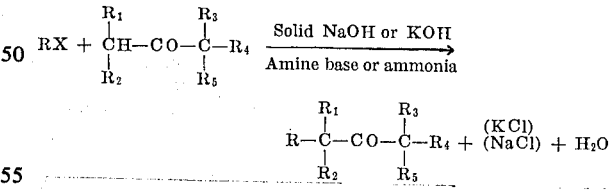

where R is hydrogen, alkyl having from one to about 12 carbon atoms, or alkenyl having from two to about 12 carbon atoms, allyl, propargyl, or cyclohexyl or a benzyl alkyl or alkenyl having from one to about 18 carbon atoms, preferably one to about eight carbon atoms; and $R_1$ and $R_3$ or $R_2$ and $R_4$ can be taken together to form a ring including the CO group to yield the corresponding cyclopentanone or cyclohexanone derivatives.

When the starting ketone contains at least one active hydrogen on each α-carbon atom, a mixture of two isomeric alkylated ketones is usually obtained, as exemplified thus for methyl ethyl ketone:

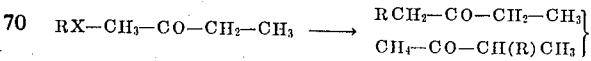

in mixture

Whenever the ketone is a methyl ketone, the reaction product is a normal, straight-chain product, if the condensation takes place at the methyl group. If it takes place at an alkyl group containing two or more carbon atoms, the reaction product is an iso or branched-chain product as shown by Example 33 below.

If the ketone has the formula

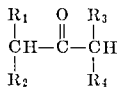

in which $R_1$, $R_2$, $R_3$ and $R_4$ have the same meaning as above and

is different from

a mixture of monosubstitution products is obtained. Thus, the process of the present invention usually provides mixtures of two isomers, which, if desired, may be separated by fractional distillation. Thus, the process of the present invention makes available many ketones which were otherwise inaccessible, or accessible only by indirect routes, involving several steps.

It is also possible to substitute more than one active $\alpha$-hydrogen per molecule, and reaction may occur at both positions adjacent to the carbonyl group. The polyalkylated products may be separated by fractional distillation, if desired.

The ketones provided by this process that have not previously been known are defined by the formula:

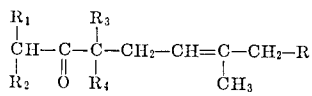

In this formula,

1. R is selected from the group consisting of hydrogen, alkyl and alkenyl groups (both straight and branched chain) having from two to about five carbon atoms.
2. $R_1$, $R_2$, $R_3$ and $R_4$ are selected from the group consisting of hydrogen and alkyl groups (both straight and branched chain) having from one to about five carbon atoms, and alkylene groups having from two to three carbon atoms wherein two of $R_1$ and $R_3$ or $R_2$ and $R_4$ are taken together to form a ring including the

group, the total number of carbon atoms in $R_1$, $R_2$, $R_3$ and $R_4$ being from two to about six, and if $R_1$, $R_2$ and $R_3$ are hydrogen, $R_4$ has at least three carbon atoms.

These ketones have a pleasant odor, unlike their lower homologues, and are useful in perfumes and in perfume manufacture.

Among the organic halides useful in carrying out the alkylation according to the present invention there may be mentioned alkyl halides, such as methyl chloride, methyl bromide, ethyl chloride, ethyl bromide, propyl chloride, isopropyl bromide, hexyl bromide, alkenyl halides, such as 1-chloro-3-butene, citronellyl chloride, allylic halides, exemplified by allyl chloride, allyl bromide, methallyl chloride, crotyl chloride, 1-chloro-3-methyl-2-butene, 1-bromo-3-methyl-2-butene, 1-chloro-2,3-dimethyl-2-butene, 1,3-dichloro-2-butene, 1-chloro-5,5,7,7-tetramethyl-2-octene, geranyl chloride, geranyl bromide, benzyl bromide and chloride may be used. Acetylenic halides, execmplified by propargyl chloride, propargyl bromide, cyclic halides, exemplified by cyclohexyl chloride, also may be used.

Among the ketones that may be alkylated according to the process of the present invention there may be mentioned alkyl ketones, for instance, acetone, methyl ethyl ketone, diethyl ketone, methyl propyl ketone, methyl isopropyl ketone, methyl isobutyl ketone, ethyl butyl ketone, methyl tertiary butyl ketone, propyl isopropyl ketone, methyl amyl ketone, methyl isoamyl ketone, methyl hexyl ketone, olefinic ketones, exemplified by mesityl oxide, allyl acetone, methyl heptenone, alpha- and beta-ionone, alicyclic ketones, for instance, cyclopentanone and alkyl derivatives thereof, cyclohexanone and alkyl derivatives thereof, methyl cyclohexanone, cycloheptanone, camphor.

Surprisingly, it has been discovered that the alkylation of ketones proceeds in the presence of catalytic quantities of the nitrogen compound in accordance with the present invention. On the other hand, in the presence of one-hundredth mole of catalyst or less, the condensation proceeds rapidly and results in a high yield of the desired alkylated ketone.

The organic amine catalysts that have given good results in accordance with the present invention are primary, secondary and tertiary amines having from one to about 60 carbon atoms, and are exemplified by the following: straight chain and branched chain saturated and unsaturated aliphatic amines and their salts, such as monomethylamine (anhydrous or in water solution); monomethylamine hydrochloride, glucosamine, mono-ethyl-, propyl-, -butyl-, -amyl-, -hexyl-, -hexenyl-, -heptyl-, -octyl-, -nonyl-, -decyl-, -dodecyl-, -oleyl- and -stearyl-amines; di-methyl-, -ethyl-, -propyl-, -allyl-, -isopropyl-, -butyl-, -isobutyl-, -tert-butyl-, -benzyl-, -pentenyl-, -hexyl-, -heptyl-, -octyl-, -nonyl-, -dodecyl-, -stearyl-, -oleyl-, -behenyl-, and -myristyl- amines; tri-methyl-, -ethyl-, -propyl-, isopropyl-, -butyl-, -isobutyl-, sec-butyl-, -tert-butyl-, -amyl-, -isoamyl-, -tert-amyl-, -hexyl-, -isohexyl-, -isooctyl-, -dodecyl-, -stearyl- and -oleyl- amines; mixed di and tri alkyl and alkenyl amines, the alkyl and alkenyl groups being selected from any of the above, such as dimethyl ethyl amine, diethyl butyl amine, hexenyl dihexyl amine, diisopropyl butyl amine, diethyl propyl amine, methyl diisopropyl amine, dimethyl dodecylamine, benzyl dimethylamine; polyamines such as methylene diamine dihydrochloride, ethylene diamine, propylene diamine, and hexamethylene tetramine; ion-exchange resins, such as Amberlite IR-4B, Ionac A-260, and Ionac A-300, which contain aliphatic polyamine groups; saturated and unsaturated heterocyclic amines, exemplified by piperidine, pyrrole, piperazine, dimethyl glyoxime, methyl nitro imidazole, and morpholine; saturated and unsaturated cycloaliphatic amines, exemplified by cyclohexyl amine, cyclohexenyl amine, cyclopropyl amine, cyclopropenyl amine, and cycloheptyl amine; alkylolamines, exemplified by monoethanolamine, diethanolamine, and triethanolamine; hydrazine $NH_2$-$NH_2$; and amino acids, exemplified by glycine, taurine, and ethylene diamine tetraacetic acid. Also useful are amine derivatives that hydrolyze in the presence of sodium or potassium hydroxide to form an organic amine having from one to about 18 carbon atoms, such as organic amides, for example dimethyl formamide, dimethyl acetamide, sulfanilamide, diamyl acetamide; and substituted ureas such as dimethyl urea.

Also effective are ammonia and inorganic ammonium salts that are hydrolyzed to form ammonia in the presence of sodium or potassium hydroxide, such as ammonium chloride, ammonium bromide, ammonium nitrate, ammonium carbonate, ammonium sulfate, ammonium phosphate, and ammonium ferric oxalate, ammonium cobalt sulfate and hydroxyl amine hydrochloride.

The amine can be a solid, liquid, or gas; gaseous amines are effective, because they are soluble in the reaction mixture.

When monoalkylation of the ketones is desired, optimum results are obtained by using the ketone and the alkylating agent in the molar ratio of between about 1:1 and about 20:1. The alkali hydroxide in this case is in the proportion between 1 and 2 moles. The optimum proportion is about 1.1 to about 1.5 moles with respect to the halide. The amount of the nitrogen compound used as catalyst, may be as low as about 0.003 mole and as high as about 1 mole per mole of alkylating agent. The preferred amount of the catalyst is between about 0.001 and about 0.1 mole.

In the case of poly-alkylation, the proportion of organic halide is increased, up to about 5 molar equivalents per mole of ketone, and the alkali metal hydroxide is increased correspondingly, in proportion to the organic halide.

Absolute purity of the starting materials is not essential. A ketone recovered from a prior alkylation may be used. The reagents need not be dry, since water is a by-product in the reaction.

In carrying out the process of the present invention, many variations are possible. The order of addition of the reactants is not critical, but no reaction takes place until the catalyst is added. For instance, the reactants may be mixed simultaneously, or the organic halide and solid alkali metal hydroxide can be added to the ketone and the catalyst, over a period of time, if a gradual reaction is desired. Mixtures of sodium and potassium hydroxide may be used, but sodium hydroxide, which is less expensive, give very satisfactory results.

The particle size of the solid sodium or potassium hydroxide is not important, because in the presence of the catalyst reaction takes place even with coarse solid alkali hydroxide. However, the sodium or potassium hydroxide must be in solid form; aqueous or alcoholic sodium or potassium hydroxide solution is ineffective in the process.

Auxiliary solvents or diluents are not necessary. Inert solvents, such as petroleum ether, benzene, and ethyl ether, have no effect on the reaction; hydroxylated solvents, such as alcohols and glycols are harmful, inasmuch as they cause hydrolysis of the organic halide to the corresponding alcohol, and thus decrease the condensation of the organic halide with the ketone.

The operation is conveniently conducted at ordinary atmospheric pressure, except in those cases where the organic halide has a boiling point below room temperature. In such cases, the reaction, for instance with methyl chloride, is carried out in a pressure vessel.

The reaction is usually mildly exothermic, and the temperature of reaction is not critical. Thus the operation may be conducted over a wide temperature range, between about $-20°$ C. and about $150°$ C. Many alkylations which proceed satisfactorily at room temperature, are faster at $50°$ to $80°$ C. The reaction time may be as short as 1 hour, but if the reaction is kept at room temperature, 1 day or longer may be required.

In the process in accordance with this invention, it is preferable but not essential to have anhydrous conditions. Up to about 0.5 mole of water per mole of halide can be present; such water dissolves in the ketone.

The progress of the reaction may be conveniently followed by the decrease in the content of organic halide. One method of working up the reaction mixture consists of filtering off the solid halide salt and the excess of alkali metal hydroxide. The resulting filter cake usually retains almost all the water of reaction, so that the excess ketone in the organic filtrate can be re-used as is, without purification. Another suitable method of working up the reaction mixture consists of adding enough water to the reaction mass to dissolve the inorganic salts, and separating the organic products in the organic layer. The desired product may then be isolated either by steam distillation or by fractional distillation in purely conventional manner.

The following are exemplary ketones falling within the invention:

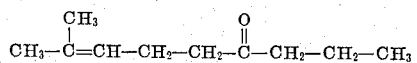

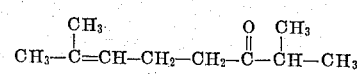

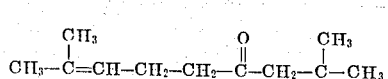

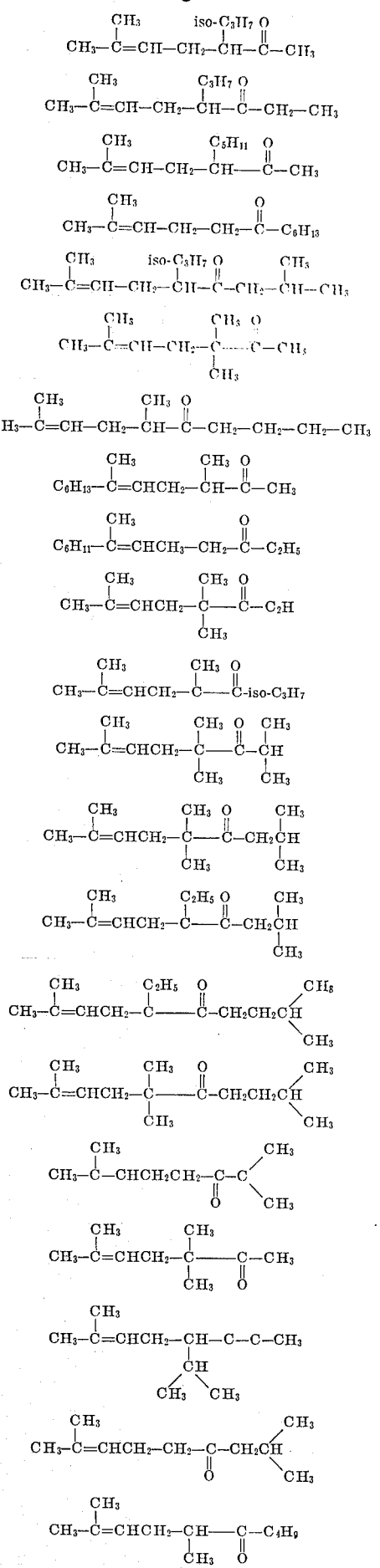

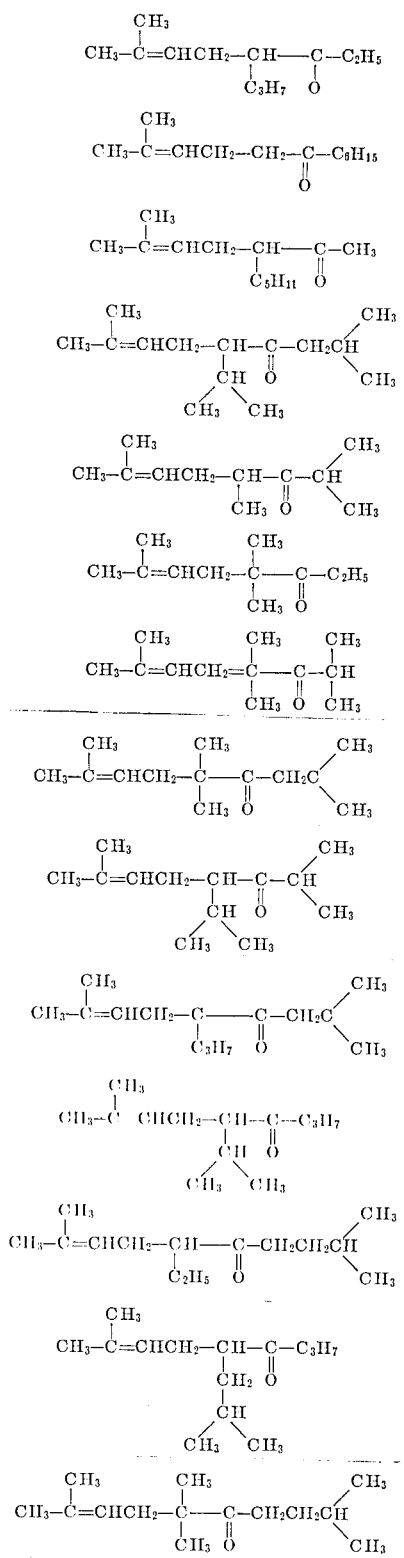

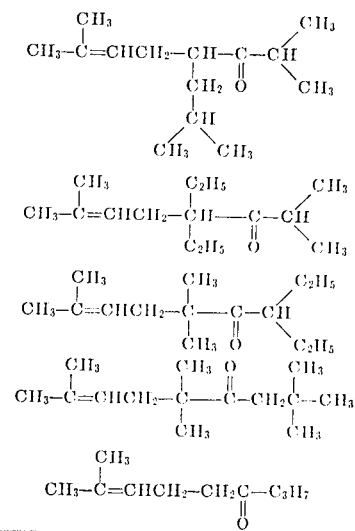

In order to illustrate more fully the scope of the present invention, the following Examples are set forth, it being understood, however, that this description is presented by way of clarification only, and not as limiting the scope of the invention.

EXAMPLE 1

A pressure bottle was charged with 58 grams acetone (1.0 mole), 180 grams methyl iodide (1.28 moles), two grams triethanolamine (TEA) and 183 grams potassium hydroxide flakes (92 percent KOH) (3.0 moles). After sealing the bottle, it was kept at 100° C. for 7 hours. After cooling, the reaction mixture was washed with acetone. Titrimetric analysis of the solid indicated that 0.92 mole of KOH had reacted to form KCl. Quantitative V.P.C. (vapor phase chromatography) analysis of the liquid filtrate indicated the formation of 0.46 mole methylated acetone, composed of over 90 percent methyl ethyl ketone, mixed with some 3 percent methyl isopropyl ketone and 2 percent diethyl ketone. The yield was 46 percent of theory from the acetone and 35 percent based on methyl iodide.

EXAMPLE 2

Example 1 was repeated in every respect except for the omission of the 2 grams triethanolamine. These are essentially the conditions described by J. U. Nef, loc. cit. The consumption of KOH was reduced to 0.22 mole and the yield of methyl ethyl ketone was 12 percent of theory based on methyl iodide.

EXAMPLES 3 to 10

Shown below in Table I are Examples illustrating the alkylation of lower ketones, that is, acetone and MEK, methyl ethyl ketone, with lower alkyl halides, that is, chlorides, bromides, iodides using flake KOH and flake NaOH as condensing agents, conducted both in the presence and in the absence of the amine catalyst of the invention. The results of Examples 1 and 2 are included in the Table. Molar proportions of halide, ketone, alkali hydroxide, and catalyst are given. The yield is stated in percent based on the halide used. The data in Table I demonstrate that the yields of alkylated products were negligible when the amine was omitted, and that good yields were obtained in the presence of the amine.

TABLE I

| Example No. | Halide | Ketone | Alkali metal hydroxide (flake) | Catalyst | Conditions | Yield percent of theory |
|---|---|---|---|---|---|---|
| 1 | 1.0 $CH_3I$ | 0.77 acetone | 3.0/KOH | 0.013 triethanolamine | 100° C., 7 hours | 35% methyl ethyl ketone. |
| 2 | 1.0 $CH_3I$ | do | 3.0/KOH | None | do | 12% MEK. |
| 3 | 1.0 $CH_3Cl$ | 7.0 MEK | 4.4/KOH | 0.05 TEA | 30° C., 20 hours | 63% methyl isopropyl ketone:diethyl ketone, 6:1. |
| 4 | 1.0 $CH_3I$ | 0.77 MEK | 3.0/KOH | None | 100° C., 7 hours | Trace methyl isopropyl ketone. |
| 5 | 1.0 $CH_3Cl$ | 2.0 acetone | 2.0/NaOH | 0.01 TEA | 25° C., 3 days | 45% MEK. |
| 6 | 1.0 $CH_3Cl$ | do | 2.0/NaOH | None | do | Nil, some residue formed. |

TABLE I – Continued

| Example No. | Halide | Ketone | Alkali metal hydroxide (flake) | Catalyst | Conditions | Yield percent of theory |
|---|---|---|---|---|---|---|
| 7 | 1.0 C$_2$H$_5$Br | 3.0 MEK | 1.5/NaOH | 0.06 dimethyl formamide (dimethylamine liberated by hydrolysis). | 25° C., 3 days, 64° C., 4 hours. | 12% methyl sec. butyl ketone. |
| 8 | 1.0 C$_2$H$_5$Br | 3.0 MEK | 1.5/NaOH | None | 25° C., 3 days, 64° C., 4 hours. | 1% methyl sec. butyl ketone. |
| 9 | 1.0 n-C$_3$H$_7$Br | 3.0 MEK | 1.5/NaOH | 0.025 dimethylamine-HCl (dimethylamine is liberated as free base). | 68° C., 1 day | 20% methyl-2-pentyl ketone and isomer. |
| 10 | 1.0 n-C$_3$H$_7$Br | 3.0 MEK | 1.5/NaOH | None | do | Nil. |

EXAMPLE 11

Into a pressure bottle were charged 98 grams (1.0 mole) cyclohexanone, 51 grams (1.0 mole) methyl chloride, 58 grams (1.4 moles) caustic soda flakes 96 percent pure, and 1.8 grams triethanolamine (0.012 mole). The bottle was sealed, was kept at 25°–30° C. for 2 days with occasional shaking, after which time the caustic soda flakes had largely disintegrated and were replaced by sandy sodium chloride. The inorganic solids were removed by dissolving in water and the dried colorless organic layer weighing 104 grams was analyzed by V.P.C. It contained 50 mole percent of 2-methyl cyclohexanone identified by comparison with the V.P.C. of a genuine sample. The yield of 2-methyl cyclohexanone from CH$_3$Cl was about 50 percent.

EXAMPLE 12

An experiment run under identical conditions, without triethanolamine, yielded only a trace of 2-methyl cyclohexanone.

EXAMPLE 13

A pressure bottle was charged with 49 grams (0.50 mole) cyclohexanone, 92 grams (1.8 moles) methyl chloride, 84 grams (2.0 moles) caustic soda flakes (97 percent), and 3.0 grams (0.02 mole) triethanolamine. After shaking, the sealed bottle for 2 days at 25°–30° C., 25 percent of the methyl chloride was recovered. The organic layer, after dissolving the inorganic solids with water, was distilled to free it from any high boiling residue. V.P.C. of the distillate and comparison with authentic samples indicated the following molar composition:

| | |
|---|---|
| Cyclohexanone | 16% |
| 2-methyl cyclohexanone | 1% |
| Dimethyl cyclohexanone | 26% |
| 2,2,6-trimethyl cyclohexanone | 33% |
| 2,2,6,6-tetramethyl cyclohexanone | 9% |

The yield of the valuable mono-, di- and trimethyl cyclohexanones was 60 percent based on cyclohexanone consumed, and 42 percent based on methyl chloride consumed.

EXAMPLE 14

A pressure bottle was charged with 19.6 grams cyclohexanone (0.20 mole), 31 grams methyl chloride (0.60 mole), 31.5 grams caustic soda flakes (0.75 mole), 0.9 gram triethanolamine (0.006 mole) and 3 grams sodium iodide (0.02 mole). The sealed bottle was tumbled at 25°–30° C. for 2 days, after which time 11 grams (0.22 mole) unreacted methyl chloride was blown off. The inorganic solids were dissolved in 110 grams water; the dried organic layer, 24 grams, gave, on distillation, 22 grams of product and a residue of only 1 – 1.5 grams. The molar composition of the colorless distillate by V.P.C. was:

| | |
|---|---|
| Cyclohexanone | 6% |
| 2-methyl cyclohexanone | 30% |
| Dimethyl cyclohexanone | 43% |
| 2,2,6-trimethyl cyclohexanone | 18% |
| 2,2,6,6-tetramethyl cyclohexanone | 2% |

The yield of the valuable mono-, di and trimethyl cyclohexanones amounted to 86 percent theory based on cyclohexanone used, and 78 percent of methyl chloride used.

The condensation of allyl-, benzyl- and propargyl halides with ketones is described in Examples 15 to 35, which for brevity are listed partly in tabular form. The reaction conditions throughout are generally similar to those of Example 15.

EXAMPLE 15

Into a reaction flask provided with a stirrer were charged 174 grams (3.0 moles) acetone, 76 grams (1.0 mole) allyl chloride, 2 grams (0.025 mole) dimethylamine hydrochloride and 63 grams (1.5 moles) caustic 96 percent soda flakes. After stirring at 25°–35° C. for 24 hours, the inorganic precipitate was filtered off, and the cake washed with acetone. The organic layer was distilled to separate it into acetone, crude allyl acetone and high boiling residue. V.P.C. analysis and comparison with an authentic sample of allyl acetone indicated a yield of 29 percent pure allyl acetone.

Similar results were obtained when the reaction was carried out at reflux temperature (54° C.) for 6 hours.

TABLE II

| Example No. | Halide | Ketone | Alkali metal hydroxide (flake) | Catalyst | Conditions | Yield of theory based on halide |
|---|---|---|---|---|---|---|
| 15 | 1.0 allyl chloride | 3.0 acetone | 1.5 NaOH | 0.025 dimethylamine-HCl | 25–30° C., 1 day | 29% allyl acetone. |
| 16 | do | do | 1.5 NaOH | None | do | 6% allyl acetone. |
| 17 | 1.0 allyl bromide | 4.0 MEK | 1.5 NaOH | 0.04 dimethylamine-HCl | 25° C., 1 day | 22% 1-methyl-1-allyl acetone, and some 1-heptene-5-one. |
| 18 | 1.0 1,3-dichloro-2-butene. | 3.0 MEK | 1.5 NaOH | 0.03 dimethylamine-HCl | do | 22% 3-methyl-6-chloro-5-heptene-2-one. |
| 19 | 1.0 1-chloro-5,5,7,7-tetramethyl-2-octene. | 3.0 acetone | 1.5 NaOH | 0.04 dimethylamine-HCl | 30° C., 6 hours | 50% 8,8,10,10-tetramethyl-5-undecene-2-one b./3.0 mm.; 115° C.; N$_D^{20}$: 1.4600. |
| 20 | 1.0 geranyl bromide. | 6.0 MEK | 1.5 NaOH | 0.05 dimethylamine-HCl | 25° C., 2 days | 34% 3,6,10-trimethyl-5,9-undecendiene-2-one b./3 mm.; 110° C.; N$_D^{20}$: 1.4684. |
| 21 | 1.0 benzyl chloride. | 3.0 acetone | 1.5 NaOH | 0.015 dimethylamine-HCl | 35° C., 5 hours | 30% benzyl acetone. |
| 22 | do | do | 1.5 NaOH | None | do | 0.5% benzyl acetone. |
| 23 | do | do | 1.5 KOH | 0.015 dimethylamine-HCl | 30° C., 5 hours | 22% benzyl acetone. |
| 24 | do | do | 1.5 KOH | None | do | 4% benzyl acetone. |
| 25 | do | 4.0 MEK | 1.5 NaOH | 0.06 dimethylamine-HCl | 25° C., 1 day | 42% 3-methyl-4-phenyl butane-2-one; b./12 mm.; 112° C.; N$_D^{20}$: 1.5094. |
| 26 | 1.0 propargyl bromide. | 6.0 acetone | 1.5 NaOH | 0.03 dimethylamine-HCl | 30° C., 1 day | 24% propargyl acetone. |

EXAMPLE 27

To a well-stirred mixture of one mole (110 grams) of 95 percent 1-chloro-3-methyl-2-butene and 5 moles (290 grams) of acetone, were added 0.10 mole (8.6 grams) of piperidine and 1.5 moles (63 grams) of 96 percent caustic soda flakes. After keeping the temperature at 30°–35° C. for 1 hour, titration indicated that 67 percent of 1-chloro-3-methyl-2-butene had reacted. This titration was conducted by adding to a measured sample of the reaction mixture an excess of 50 percent alcoholic potassium hydroxide, which, on heating, hydrolyzed the chloride to the carbinol, with liberation of hydrochloric acid. The latter was neutralized by the potassium hydroxide, and the excess alcoholic alkali titrated.

After 3 hours, when the unreacted 1-chloro-3-methyl-2-butene had dropped to 5 percent of the original, the reaction mass was cooled to 20° C., filtered to remove sodium chloride and the excess caustic soda, and the liquid phase distilled. There was obtained 86 grams of crude methylhepten-one (b.p. 55°–85° C./13 mm.) and 42 grams of a higher boiling residue. The crude methylheptenone analyzed 72 percent methylheptenone by V.P.C., corresponding to a yield of 49 percent methylheptenone from the 1-chloro-3-methyl-2-butene. Fractional distillation of the crude methyl-heptenone yielded 46 percent of pure methylheptenone, purity 98 – 100 percent by V.P.C., b.p. 170°–172° C./760 mm.; $n_D^{20} = 1.4410$.

The reported refractive index of pure 6-methyl-5-hepten-2-one is $n_D^{20} = 1.4410 - 1.4415$. *Bull soc. chim. France* [4]39 1125 (1926).

The superiority of the process in accordance with the instant invention to the process of Example III of British Pat. No. 851,658, where sodium hydroxide was used, is obvious. A yield of 20 percent is there reported, but this figure is based on the combined weight of two fractions, over a wide rangeof boiling point, and with refractive index $n_D^{25} = 1.449$ and 1.4470, respectively. The high refractive index is indicative of the presence of the by-product which is obtained when 6-methyl-5-hepten-2-one itself reacts with 1-chloro-3-methyl-2-butene. The high refractive index of these two fractions suggests, at the most, a purity of 50 percent.

It is reported in Example III of British Pat. No. 851,658 that when the two fractions were redistilled, a fraction was obtained, for which no yield is given, of refractive index $n_D^{25} = 1.4369$. This fraction also must have been very impure and the low refractive index suggests the presence of diacetone alcohol, a by-product obtained by the self-condensation of acetone. The low refractive index of this fraction indicates a purity of 50–70 percent.

EXAMPLE 28

The conditions of Example 27 were repeated without the addition of the piperidine. After three hours at 30° C., there was no measurable decrease in 1-chloro-3-methyl-2-butene. After 1 day, 96 percent of the initial halide was still present; and after working up the reaction mass, the content of methylheptenone was found to be about 2 percent of theory. Comparison between Examples 27 and 28 demonstrates the extraordinary advantage of the process in accordance with this instant invention, that is in the use of the catalyst.

EXAMPLE 29

The conditions of this experiment are identical with those of Example III in British Pat. No. 851,658.

To 42 grams caustic 96 percent soda flakes (1.0 mole) were added 100 ml. tetrahydrofuran and a mixture prepared from 110 grams 1-chloro-3-methyl-2-butene, 95 percent (1.0 mole), and 58 grams acetone (1.0 mole), over a period of 1 hour. The mixture was heated to reflux temperature and allowed to agitate at 65° C. for 4 hours. To the mixture was added 100 grams water with cooling, and the supernatant organic layer was separated. After extracting the water layer with petroleum ether, the combined organic layer was distilled. The cut which contained methylheptenone was 17 grams, boiling at 13 mm. from 40°–80° C. V.P.C. analysis indicated a purity of 52 percent, equal to 8.8 grams methyl-heptenone or 7 percent of theory.

EXAMPLE 30

This experiment was conducted according to Example II of British Pat. No. 851,658.

174 grams acetone (3.0 moles) was mixed with 124 grams caustic potash flakes (94 percent) (2.0 moles), and 106 grams 1-chloro-3-methyl-2-butene, 98 percent (1.0 mole) was added gradually over 15 minutes at 20° C. The mass was agitated for 3 hours under cooling to maintain a temperature of 20° C.± 3° C. The inorganic salts were filtered off, and freed from any adhering reaction product by repeated washing with acetone. Analysis of the inorganic salts indicated that 70 percent of the 1-chloro-3-methyl-2-butene had not reacted. On fractional distillation of the organic layer, the fraction boiling between 40° C. and 70° C. at 15 mm. vacuum, contained the methyl-heptenone yield: 30 grams. It consisted of 71 percent methylheptenone by V.P.C. corresponding to a yield of 17 percent methylheptenone from 1-chloro-3-methyl-2-butene.

EXAMPLE 31

When the above experiment was repeated using only 1.5 moles of KOH, the unreacted 1-chloro-3-methyl-2-butene decreased to about 65 percent and the yield of methylheptenone increased to about 24 percent.

EXAMPLE 32

Example 31 was repeated with the addition of 1 gram of dimethylamine hydrochloride (0.012 mole). The unreacted 1-chloro-3-methyl-2-butene dropped to 9 percent and the yield of methylheptenone increased to 43 percent of theory.

EXAMPLE 33

108 grams 1-chloro-3-methyl-2-butene (1.0 mole) were added under stirring to a mixture of 288 grams methyl ethyl ketone (4.0 moles), 63 grams caustic soda flakes (96 percent) (1.5 moles), and 3.2 grams dimethylamine hydrochloride (0.04 mole) and the mass agitated for 6 hours at a temperature of 30° C. The unreacted 1-chloro-3-methyl-2-butene dropped to 5 percent of the original. After isolating the reaction product in the usual manner, a fraction of 100 grams boiling from 60° to 85° C. was obtained, which by V.P.C. analysis contained 92 percent of the desired reaction product equal to 66 percent of theory based on 1-chloro-3-methyl-2-butene. Careful fractionation gave over 60 percent of theory of a mixture of 3,6-dimethyl-5-hepten-2-one and 1-methyl-6-octen-3-one in a ratio of 85:15 parts.

Substitution of 1-bromo-3-methyl-2-butene for the 1-chloro-3-methyl-2-butene gave a similar yield of 65 percent of theory.

EXAMPLE 34

When Example 33 was repeated without the addition of the dimethylamine hydrochloride, the unreacted 1-chloro-3-methyl-2-butene amounted to 96 percent of the original. Refluxing for 4 hours at 83° C. did not speed up the reaction noticeably. After 3 days at 30° C., the unreacted 1-chloro-3-methyl-2-butene still amounted to 90 percent of the original; and the yield of the desired homo methyl heptenone was less than 5 percent of theory.

Substitution of 1-bromo-3-methyl-2-butene for the 1-chloro-3-methyl-2-butene did not speed up the reaction perceptibly.

EXAMPLES 35 to 59

Table III below lists Examples 35 to 59 in which flake NaOH was used as the condensing agent with various catalysts. The Examples were prepared by the procedures of Example 33. The alkylating agent was 1-chloro-3-methyl-2-butene.

TABLE III

| Example No. | Mole NaOH (flake) | Mole ketone | Mole catalyst | Conditions | Yield, percent of theory methylheptenone or homo methylheptenone |
|---|---|---|---|---|---|
| *Ammonia and derivatives* | | | | | |
| 35 | 1.5 | 6.0 acetone | 0.10 ammonium chloride (formed NH₃ by hydrolysis) | 25° C., 1 day | 46 |
| 36 | 1.5 | 3.0 acetone | 0.05 NH₃; 0.50 H₂O | 25° C., 2 days | 40 |
| 37 | 1.5 | 4.0 MEK | 0.10 urea (formed NH₃ by hydrolysis) | 30° C., 3 days | 44 |
| 38 | 1.5 | 4.0 MEK | 0.10 hydroxylamine HCl | 25° C., 5 days | 43 |
| *Primary amines* | | | | | |
| 39 | 1.5 | 6.0 acetone | 0.10 monoethanolamine | 30° C., 1 day | 40 |
| 40 | 1.5 | 6.0 acetone | 0.10 butyl amine | 30° C., 1 day | 43 |
| 41 | 1.5 | 4.0 MEK | 0.10 propylenediamine-1,2 | 30° C., 2 days | 37 |
| *Secondary amines and amides* | | | | | |
| 42 | 1.3 | 3.0 acetone | 0.006 dimethylamine, 25% water solution | 30° C., 7 hours | 46 |
| 43 | 1.25 | 4.0 acetone | 0.003 dimethylamine hydrochloride | 30° C., 1 day | 45 |
| 44 | 1.5 | 5.0 acetone, 5.0 benzene | 0.03 dimethylamine hydrochloride | 30° C., 1 day | 42 |
| 45 | 1.5 | 6.0 acetone | 0.03 dimethylamine hydrochloride, 0.50 water | 30° C., 1 day | 47 |
| 46 | 1.5 | 8.0 acetone | 0.025 dimethylamine, 1.0 NaI | 30° C., 3 hours | 58 |
| 47 | 1.5 | 5.0 acetone | 0.10 diethylamine | 35° C., 4 hours | 48 |
| 48 | 2.0 | 4.0 MEK | 0.10 diethanolamine | 30° C., 3 days | 44 |
| 49 | 1.5 | 4.0 MEK | 0.10 piperazine | 25° C., 2 days | 50 |
| 50 | 1.5 | 4.0 MEK | 0.08 dimethylacetamide¹ | 30° C., 6 days | 50 |
| 51 | 1.5 | 6.0 acetone | 1.0 dimethylformamide¹ | 35° C., 3 hours | 53 |
| 52 | 1.5 | do | 0.06 dimethylformamide,¹ 0.50 H₂O | 30° C., 6 hours | 52 |
| 53 | 1.5 | do | 0.06 dimethylformamide¹ | 30° C., 1 day | 45 |
| 54 | 1.5 | 4.0 acetone | Amberlite IR-4B | 25° C., 3 days | 40 |
| *Tertiary amines* | | | | | |
| 55 | 1.5 | 5.0 acetone | 0.10 triethylamine | 30° C., 3 hours | 46 |
| 56 | 1.5 | 4.0 MEK | 0.10 triethanolamine | 30° C., 3 days | 54 |
| 57 | 1.5 | 4.0 MEK | 0.10 benzyldimethylamine | 30° C., 2 days | 54 |
| *Amino acids* | | | | | |
| 58 | 1.5 | 4.0 acetone | 0.08 glycine | 25° C., 3 days | 34 |
| 59 | 1.5 | do | 0.05 taurine | do | 40 |

¹ Formed dimethylamine, by hydrolysis.

EXAMPLES 60 to 68

Examples 60 to 68 illustrate the alkylation of several ketones other than acetone, with 1-chloro-3-methyl-2-butene, in accordance with the process of this invention. The process used for their preparation was as set forth in Example 27, substituting the ketone in Table IV in the same molar proportion. The ketones listed in Table IV are new compounds.

The new ketones are of value in the perfume industry, both in the pure form, as well as the isomeric mixtures which are obtained when the starting ketone has more than one active hydrogen and is unsymmetrical. Careful fractionation permits isolation of the isomers in pure form.

The novel ketones of Table IV are also useful in the manufacture of many novel perfume materials of the terpenoid type, that is, in the preparation of compounds of the linalool, geraniol, citral and ionone types, as described in our copending application Ser. No. 300,907, now U.S. Pat. No. 3,296,080.

For instance, 4,7-dimethyl-6-octen-3-one prepared in Example 60 may be reacted with vinyl magnesium bromide to give a tertiary carbinol of the linalool type, which has valuable odor properties. Further, the tertiary carbinols may be oxidized to the aldehyde, the latter condensed with acetone to give a pseudoionone, which is then cyclized to the corresponding ionone, as described in our copending application Ser. No. 300,907; now U.S. Pat. No. 3,296,080. The ionones obtained from the novel ketones of the instant invention are of outstanding value in perfumery.

In Examples 64 and 65, $R_1$ and $R_3$ in the general formula given in Table IV are linked, form a cyclic structure with the carbonyl group in the ring, that is, the cyclopentanone and cyclohexanone ring.

3,6,10-Trimethyl-5,9-undecenediene-2-one, prepared in Example 20, is a new compound. The substance exhibits outstanding value, as compared with geranyl acetone and ethyl geranyl acetone, the former being the trade name for 6,10-dimethyl-5,9-hendecadien-2-one, and the latter being 6,10-dimethyl-5,9-dodecadien-2-one. The latter two substances are marketed in the perfume industry. The novel substance prepared according to this instant invention, 3,6,10-trimethyl-5,9-undecenediene-2-one has a much richer floral-type odor than geranyl acetone and ethyl geranyl acetone, so that it has greater ability to impart a fresh note in many florals, such as rose, lily of the valley, lavender and gardenia. It is better suited than geranyl acetone and ethyl geranyl acetone for reinforcing odor and for blending with a variety of floral compositions. One of its main advantages is that it does not have the sharp and pungent characteristics of geranyl acetone and thus may be used in larger amounts in perfuming compositions to impart roundness, lasting power and stability. Another advantage is that the compound of this application has a more stable odor than geranyl acetone, that is, the odor lasts longer and is not affected by aging.

Determination of Odor Lasting Power of 3,6,10-trimethyl-5,9-undecenediene-2-one The test for odor stability was conducted as follows:

Two strips of blotting paper of ¼ inch width were immersed for equal length of time into (A) geranyl acetone and (B) 3,6,10-trimethyl-5,9-undecenediene-2-one. The strips were allowed to stand at room temperature and the odor was evaluated and compared every day for a period of 7 days. The strip (A) exhibited a change in odor within 24 hours to a less pleasant and weaker odor. After 4 days, the odor has disappeared. The test strip (B) showed practically no odor change. The odor of (B) after 7 days was slightly weaker, but was still pleasant and essentially unchanged. Thus, 3,6,10-trimethyl-5,9-undecenediene-2-one exhibits vastly superior stability and lasting power than geranyl acetone.

Example 69 below illustrates the application of 3,6,10-trimethyl-5,9-undecenediene-2-one in the perfume industry.

EXAMPLE 69

(Rose Bouquet)

The following ingredients were blended together:

TABLE IV.—CONDENSATION OF 1-CHLORO-3-METHYL-2-BUTENE WITH VARIOUS KETONES $$CH_2=\overset{CH_3}{\underset{}{C}}-CH-CH_2-\overset{R_1}{\underset{R_2}{C}}-CO-\overset{R_3}{\underset{R_4}{CH}}$$

| Example No. | Ketone used | Name | R groups | Boiling point, °C. | $N_D^{20}$ | Yield, percent | Odor | Melting point of semi-carbazone, °C. |
|---|---|---|---|---|---|---|---|---|
| 60 | $C_2H_5COC_2H_5$ | 4,7-dimethyl-6-octen-3-one a | $R_1=CH_3$; $R_3=CH_3$; $R_2$ and $R_4=H$ | B.P./13 mm., 78° | 1.440 | 60 | Fruity; apricot-grape-fruit. | 65–66 |
| 61 | $CH_3COC_3H_7$ | 8-methyl-7-nonen-4-one | $R_4$, $R_2$, $R_3=H$; $R_4=C_2H_5$ | B.P./7 mm., 78° | 1.4450 | 61 | Woody and winelike | 100–101 |
| 62 | $CH_3COi=C_3H_7$ | 2,7-dimethyl-6-octen-3-one | $R_1$ and $R_2=H$; $R_3=CH_3$; $R_4$ and $R_4=H$; isomers 15:85. | B.P./10 mm., 80° b | b 1.4464 | 51 | Sweet, rosewood type b | 101–102 |
| 63 | $CH_3COi$-butyl | 3-isopropyl-6-methyl-5-hepten-2-one, 2,8-dimethyl-7-nonen-4-one. | $R_1=(CH_3)_2CH$; $R_2$, $R_3$ and $R_4=H$; $R_1$, $R_2$ and $R_4=H$; $R_3=(CH_3)_2CH$; isomers 60:40. | B.P./4 mm., 68° b | b 1.4438 | 50 | Sweet verbena type b | b 104–6 |
| 64 | Cyclopentanone | 2-(3-methyl-2-butenyl)-cyclopentanone | $R_1+R_3=(CH_2)_3$; $R_2$ and $R_4=H$ | B.P./3 mm., 71° | 1.4718 | 33 | Natural mint type | 176–8 |
| 65 | Cyclohexanone | 2-(3-methyl-2-butenyl)-cyclohexanone | $R_1+R_3=(CH_2)_4$; $R_2$ and $R_4=H$ | B.P./2 mm., 75° b | 1.4790 | 52 | Earthy and woody | 162–3 |
| 66 | $C_5H_{11}COC_4H_9$ | 4-propyl-7-methyl-6-octen-3-one | $R_1=C_3H_7$; $R_3=CH_3$; $R_2$ and $R_4=H$ | B.P./3 mm., 72° b | b 1.4465 | 51 | Fruity; pearlike b | |
| 67 | $CH_3COC_6H_{13}$ | 3-amyl-6-methyl-5-hepten-2-one, 11-methyl-10-dodecen-7-one. | $R_1=C_5H_{11}$, $R_2$, $R_3$ and $R_4=H$; $R_1$, $R_2$ and $R_4=H$; $R_3=C_5H_{11}$; isomers 90:10. | B.P./3 mm., 95° b | b 1.4505 | 50 | Woody b | |
| 68 | Di-isobutyl ketone | 2,8-dimethyl-5-isopropyl-7-nonen-4-one | $R_1+R_3=(CH_3)_2CH$; $R_2$ and $R_4=H$ | B.P./2 mm., 80° | 1.4482 | 30 | Earthy | | a Phenyl hydrazone, M. 56–57° C.
b For the mixture.
c Normal isomer.

| | |
|---|---|
| 10 parts | 3,6,10-trimethyl-5,9-undecenediene-one |
| 1 part | phenylacetaldehyde |
| 5 parts | citronellyl acetate |
| 19 parts | geraniol |
| 25 parts | citronellol |
| 40 parts | phenylethyl alcohol |
| 100 | |

The resulting composition had a very pleasant rose bouquet note.

Also 3-isopropyl-6-methyl-5-hepten-2-one of Example 63 proved of far greater value than the known 6-methyl-5-hepten-2-one. The latter substance has a sharp, citrus-type note, which limits its use to low-cost products and even then, only in small amounts.

The novel substance 3-isopropyl-6-methyl-5-hepten-2-one exhibits an entirely different character from 6-methyl-5-hepten-2-one. It exhibits a lasting, soft, sweet, and floral character which makes it a far superior blender for incorporation into a variety of floral compositions. In direct contrast with 6-methyl heptenone, the 3-isopropyl compound has a fresh outdoor, "-cooling" note. When allowed to evaporate on a test blotting paper, 3-isopropyl 6-methyl-5-hepten-2-one is free of the pungent, sharp, metallic and undesirable note which is detected in the case of 6-methyl heptenone, under the same conditions.

Deterimination of Odor Lasting Power of 3-isopropyl-6-methyl-5-hepten-2-one

The 3-isopropyl compound exhibits greatly improved lasting power over 6-methyl heptenone. The test was conducted by dipping test paper strips, for the same length of time, into both products and comparing the time required for evaporation at room temperature. The 3-isopropyl 6-methyl heptenone required a period of 4 hours for evaporation, while, in the case of 6-methyl heptenone, the evaporation time was 30 minutes.

The isopropyl substitution product of this invention is superior to and more suited than methyl heptenone for incorporation into a variety of high quality soaps and other cosmetics. It is valuable for muguet, verbena, lavender, chypre-fougere notes.

In view of the better odor characteristics, the isopropyl compound may be used in perfume compositions in larger amounts than methyl heptenone, and may be used particularly in finer perfume compositions, where the pungent note of methyl heptenone cannot be tolerated.

Example 70 below illustrates the application of 3-isopropyl-6-methyl-5-heptene-2-one in the perfume industry.

EXAMPLE 70

(Verbena Bouquet)

| | |
|---|---|
| 5 parts | 3-isopropyl-6-methyl-5-hepten-2-one |
| 3 parts | 6-methyl-5-hepten-2-one |
| 10 parts | linalool |
| 12 parts | citral |
| 15 parts | dipentene |
| 25 parts | geraniol |
| 30 parts | alpha terpeneol |

The ingredients were blended together in any sequence. The resulting composition exhibited an outstanding Verbena Bouquet odor.

The other novel compounds of this invention also exhibit valuable properties in the perfume industry.

Example 71 below demonstrates the utility of 4,7-dimethyl-6-octen-3-one (Example 60) and 8-methyl-7-nonen-4-one (Example 61), in the perfume industry.

EXAMPLE 71

(Lavender Synthetic)

The following ingredients were blended together:

| | |
|---|---|
| 100 parts | linalyl acetate |
| 75 parts | linalool |
| 35 parts | coumarin |
| 150 parts | 4,7-dimethyl-6-octen-3-one |
| 140 parts | 8-methyl-7-nonen-4-one |

The composition had a very fresh true lavender character.

Example 72 below illustrates the application of the mixture of 2,7-dimethyl-6-octen-3-one and 3,3,6-trimethyl-5-hepten-2-one (Example 62) in perfumery.

EXAMPLE 72

(Rosewood Oil Artificial)

| | |
|---|---|
| 1 part | encalyptol |
| 3 parts | dipentene |
| 5 parts | alpha terpineol |
| 10 parts | Cedarwood Oil |
| 75 parts | linalool |

The above ingredients were blended together. The resulting composition had a very pleasant rosewood oil character.

The condensation of allyl-, benzyl- and propargyl halides with ketones and various amines is described in Examples 73 to 84, which for brevity are listed partly in tabular form. The reaction conditions throughout are generally similar to those of Example 73.

EXAMPLE 73

Into a reaction flask provided with a stirrer were charged 174 grams (3.0 moles) acetone, 76 grams (1.0 mole) allyl chloride, the amount of organic amine as noted on Table V, and 63 grams (1.5 mole) caustic 96 percent soda flakes. After stirring at 25°–35° C. for 24 hours, the inorganic precipitate was filtered off, and the cake washed with acetone. The organic layer was distilled to separate it into acetone, crude allyl acetone and high boiling residue. V.P.C. analysis and comparison with an authentic sample of allyl acetone indicated a yield of 29 percent pure allyl acetone.

Similar results were obtained when the reaction was carried out at reflux temperature (54° C.) for 6 hours.

EXAMPLES 85 to 96

Table VI below lists Examples 85 to 96 in which flake NaOH was used as the condensing agent and the catalyst was either an organic amine, or a nitrogen compound liberating an amine in situ, or an inorganic ammonium compound liberating ammonia in situ. The alkylating agent was 1-chloro-3-methyl-2-butene.

The foregoing Examples illustrate the utility of this instant invention in providing a simple and inexpensive process for the alkylation of aliphatic monoketones and in providing novel compounds which have great value in the perfume industry. Although many examples have been given, those skilled in this art will readily visualize that many variations and modifications of this instant invention are possible, without departing from the spirit of the invention, which is to be limited only by the scope of the appended claims.

Having regard to the foregoing disclosure, the following is claimed as the inventive and patentable embodiments thereof:

1. A method for the alkylation in the position alpha to the carbonyl group of a ketone having the formula:

$$\begin{array}{c} R_1 \\ \diagdown \\ R_2 \end{array} CH-CO-C \begin{array}{c} R_3 \\ \diagup \\ \diagdown \\ R_5 \end{array} R_4$$

wherein each of $R_1$, $R_2$, $R_3$, $R_4$ and $R_5$ is selected from the group consisting of hydrogen, alkyl and alkenyl having from one to about 18 carbon atoms, and alkylene having from two to three carbon atoms wherein two of $R_1$ and $R_3$ or $R_2$ and $R_4$ are taken together to form a ring including the CO group, which comprises reacting said ketone at a temperature within the range from about −20° to about 150° C. with an alkylating

TABLE V

| Example No. | Halide | Ketone | Alkali metal hydroxide (flake) | Amount and catalyst | Conditions | Ketone product |
|---|---|---|---|---|---|---|
| 73 | 1.0 allyl chloride | 3.0 acetone | 1.5 NaOH | 0.025 tributylamine | 25–30° C., 1 day | Allyl acetone. |
| 74 | do | do | 1.5 NaOH | 0.025 cyclohexylamine | 25–30° C., 1 day | Do. |
| 75 | 1.0 allyl bromide | 4.0 MEK | 1.5 NaOH | 0.1 pyrrole | 25° C., 1 day | 1-methyl-1-allyl acetone, and some 1-heptene-5-one. |
| 76 | 1.0 1,3-dichloro-2-butene | 3.0 MEK | 1.5 NaOH | 0.05 coconut oil alkyl dimethylamine. | 25° C., 1 day | 3-methyl-6-chloro-5-heptene-2-one. |
| 77 | 1.0 1-chloro-5,5,7,7-tetramethyl-3-octene. | 3.0 acetone | 1.5 NaOH | 0.06 monooleylamine | 30° C. 6 hours | 8,8,10,10-tetramethyl-5-undecene-2-one. |
| 78 | 1.0 geranyl bromide | 6.0 MEK | 1.5 NaOH | 0.1 isopropyl amine-HCl | 25° C., 2 days | 3,6,10-trimethyl-5,9-undecendiene-2-one. |
| 79 | 1.0 benzyl chloride | 3.0 acetone | 1.5 NaOH | 0.1 methyl amine-HCl | 35° C., 5 hours | Benzyl acetone. |
| 80 | do | do | 1.5 NaOH | 0.3 ethylene diamine | 35° C., 5 hours | Do. |
| 81 | do | do | 1.5 KOH | 0.01 benzylamine | 30° C | Do. |
| 82 | do | do | 1.5 KOH | 0.1 dimethyl glyoxime | 30° C., 5 hours | Do. |
| 83 | do | 4.0 MEK | 1.5 NaOH | 0.06 triisooctyl amine | 25° C., 1 day | 3-methyl-4-phenyl butane-2-one. |
| 84 | 1.0 propargyl bromide | 6.0 acetone | 1.5 NaOH | 0.1 Amberlite LA-2 secondary amine. | 30° C., 1 day | Propargyl acetone. |

TABLE VI

| Example No. | Mole NaOH (flake) | Mole ketone | Mole catalyst | Conditions |
|---|---|---|---|---|
| 85 | 1.5 | 6.0 acetone | 0.1 ammonium nitrate | 25° C., 1 day. |
| 86 | 1.5 | 3.0 acetone | 0.1 ammonium sulfate | 25° C., 2 days. |
| 87 | 1.5 | 4.0 MEK | 0.1 ammonium ferric oxalate | 30° C., 2 days. |
| 88 | 1.5 | 4.0 MEK | 0.10 ammonium cobalt sulfate | 25° C., 5 days. |
| 89 | 1.5 | 6.0 acetone | 0.10 methyl nitro imidazole | 30° C., 1 day. |
| 90 | 1.5 | do | 0.10 hexamethylene tetramine | 30° C., 1 day. |
| 91 | 1.5 | 4.0 MEK | 0.10 glucosamine | 30° C., 2 days. |
| 92 | 1.3 | 3.0 acetone | 0.1 laurylamine | 30° C., 7 hours. |
| 93 | 1.25 | 4.0 acetone | 0.1 diallylamine | 30° C., 1 day. |
| 94 | 1.5 | {5.0 acetone, 5.0 benzene} | 0.05 Amberlite XLA-3 primary amine | 30° C., 1 day. |
| 95 | 1.5 | 6.0 acetone | 0.1 Ionac A-260 aliphatic polyamine ion exchange resin | 30° C., 1 day. |
| 96 | 1.5 | 8.0 acetone | 0.1 sulfanilamide | 30° C., 3 days. | agent selected from the group consisting of alkyl and alkenyl chlorides and bromides having from one to about 12 carbon atoms, and allyl, propargyl, cyclohexyl, and benzyl chlorides and bromides, in the presence of a solid alkali metal hydroxide and selected from the group consisting of potassium hydroxide, sodium hydroxide and mixtures thereof, and as a catalyst a nitrogen compound which is selected from the group consisting of ammonia and aliphatic, cycloaliphatic and heterocyclic hydrocarbon amines having from one to about 60 carbon atoms, such hydrocarbon amines containing hydroxy substituents, such hydrocarbon amines containing carboxylic acid substituents, and such hydrocarbon amines containing nitro substituents, the amounts of the ketone and alkylating agent being in the molar ratio of from 1:5 to about 20:1, the alkali hydroxide being in the proportion of from 1 to 2 moles per mole of alkylating agent, and the amount of nitrogen compound being within the range from about 0.003 mole to about 1 mole per mole of alkylating agent.

2. A process in accordance with claim 1, in which the catalyst is ammonia.

3. A process in accordance with claim 1, in which the catalyst is an organic amine.

4. A process in accordance with claim 1, in which the ketone has the formula:

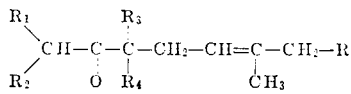

wherein:
1. R is selected from the group consisting of hydrogen and straight and branched chain alkyl and alkenyl groups having from two to about five carbon atoms, and 2. $R_1$, $R_2$, $R_3$ and $R_4$ are selected from the group consisting of hydrogen, straight and branched chain alkyl groups having from one to about five carbon atoms, and alkylene groups having from two to three carbon atoms wherein two of $R_1$ and $R_3$ or $R_2$ and $R_4$ are taken together to form a ring including the $$\overset{\text{C}}{\underset{\text{O}}{\|}}$$

group, the total number of carbon atoms in $R_1$, $R_2$, $R_3$ and $R_4$ being from two to about six, and $R_1$, $R_2$ and $R_3$ are hydrogen, $R_4$ has at least three carbon atoms.

5. A process in accordance with claim 1, wherein said ketone is unsymmetrical and contains one active hydrogen on each of the two carbon atoms adjacent to the carbonyl group and a mixture of monosubstitution products is obtained.

6. A process in accordance with claim 1, wherein the molar ratio of said ketone to said alkylating agent is between 1:1 and 20:1, the ratio of alkali metal hydroxide to said alkylating agent is between 1:1 and 1:2, and the ratio of said nitrogen compound to said alkylating agent is between 0.0,003:1 and 1:1, and a monoalkylated product is obtained.

7. A process in accordance with claim 1, wherein said ketone contains more than one active hydrogen in the two positions alpha to its carbonyl group, and the molar ratio of said ketone to said alkylating agent is between 1:2 and 1:5, the molar proportion of said alkali metal hydroxide corresponds to the molar proportion of said alkylating agent, and a polyalkylated product is obtained.

* * * * *

UNITED STATES PATENT OFFICE
CERTIFICATE OF CORRECTION

Patent No. 3,668,255　　　　　　　　　　Dated June 6, 1972

Inventor(s) Walter C. Meuly et al.

It is certified that error appears in the above-identified patent and that said Letters Patent are hereby corrected as shown below:

Column 15, Table IV: "$CH_3COi=C_3H_7$" should read -- $CH_3CO$ iso-$C_3H_7$ --. Column 19, line 11, insert "and" after -- substituents --; and after "acid" insert -- COOH --.

Signed and Sealed this ninth Day of March 1976

[SEAL]

Attest:

RUTH C. MASON
*Attesting Officer*

C. MARSHALL DANN
*Commissioner of Patents and Trademarks*